US010760397B2

(12) United States Patent
Vo et al.

(10) Patent No.: US 10,760,397 B2
(45) Date of Patent: Sep. 1, 2020

(54) FORMING PROPPANT-FREE CHANNELS IN A PROPPANT PACK

(71) Applicant: Halliburton Energy Services, Inc., Houston, TX (US)

(72) Inventors: Loan Vo, Houston, TX (US); Prashant D. Chopade, Kingwood, TX (US); Philip D. Nguyen, Houston, TX (US); Christopher Parton, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 36 days.

(21) Appl. No.: 16/077,996

(22) PCT Filed: May 18, 2016

(86) PCT No.: PCT/US2016/032984
§ 371 (c)(1),
(2) Date: Aug. 14, 2018

(87) PCT Pub. No.: WO2017/200537
PCT Pub. Date: Nov. 23, 2017

(65) Prior Publication Data
US 2019/0352559 A1  Nov. 21, 2019

(51) Int. Cl.
*E21B 43/267* (2006.01)
*C09K 8/64* (2006.01)
(Continued)

(52) U.S. Cl.
CPC .............. *E21B 43/267* (2013.01); *C09K 8/64* (2013.01); *C09K 8/68* (2013.01); *C09K 8/706* (2013.01); *C09K 8/805* (2013.01)

(58) Field of Classification Search
None
See application file for complete search history.

(56) References Cited

U.S. PATENT DOCUMENTS

| 4,078,609 | A  | * | 3/1978 | Pavlich | ................. | E21B 33/138 |
| | | | | | | 166/271 |
| 6,725,931 | B2 | * | 4/2004 | Nguyen | ................... | C09K 8/68 |
| | | | | | | 166/280.2 |

(Continued)

FOREIGN PATENT DOCUMENTS

| WO | WO-2015/112418 A1 | 7/2015 | | |
| WO | WO2016010525 | * | 1/2016 | ............... C09K 8/80 |

OTHER PUBLICATIONS

International Search Report and Written Opinion from PCT/US2016/032984, dated Jan. 17, 2017, 11 pages.
(Continued)

*Primary Examiner* — Anuradha Ahuja
(74) *Attorney, Agent, or Firm* — McGuirewoods, LLP

(57) ABSTRACT

Proppant-free channels may be formed in a proppant pack in subterranean formations by using the miscibility and immiscibility of proppant-laden and proppant-free fluids. For example, a method of forming a proppant pack may include: introducing, in alternating order, a proppant-laden fluid and a proppant-free fluid into a wellbore penetrating a subterranean formation, wherein the proppant-laden fluid comprises an oil-external emulsion and a proppant, and wherein the proppant-free fluid is immiscible with the proppant-laden fluid; and forming a proppant pack in a fracture in the subterranean formation, wherein the proppant pack comprises proppant-laden clusters and proppant-free channels.

16 Claims, 3 Drawing Sheets

(51) Int. Cl.
*C09K 8/68* (2006.01)
*C09K 8/70* (2006.01)
*C09K 8/80* (2006.01)

(56) References Cited

U.S. PATENT DOCUMENTS

| | | | |
|---|---|---|---|
| 6,776,235 B1* | 8/2004 | England | E21B 43/267 166/271 |
| 7,281,581 B2 | 10/2007 | Nguyen et al. | |
| 8,540,024 B2 | 9/2013 | Kosarev et al. | |
| 9,085,727 B2 | 7/2015 | Litvinets et al. | |
| 9,222,013 B1 | 12/2015 | Champagne et al. | |
| 2007/0289781 A1* | 12/2007 | Rickman | C09K 8/68 175/65 |
| 2008/0135242 A1* | 6/2008 | Lesko | C09K 8/665 166/268 |
| 2009/0137432 A1* | 5/2009 | Sullivan | C09K 8/602 507/219 |
| 2010/0243242 A1* | 9/2010 | Boney | E21B 43/025 166/250.01 |
| 2013/0161003 A1* | 6/2013 | Makarychev-Mikhailov | C09K 8/685 166/280.1 |
| 2014/0054035 A1* | 2/2014 | Nguyen | C09K 8/70 166/280.2 |
| 2014/0060826 A1 | 3/2014 | Nguyen | |
| 2014/0131041 A1* | 5/2014 | Liang | C09K 8/805 166/280.2 |
| 2014/0131042 A1* | 5/2014 | Nguyen | C09K 8/80 166/280.2 |
| 2014/0251610 A1 | 9/2014 | Brannon et al. | |
| 2014/0290943 A1* | 10/2014 | Ladva | E21B 43/267 166/280.1 |
| 2014/0299326 A1 | 10/2014 | Crews | |
| 2014/0367100 A1 | 12/2014 | Oliveira et al. | |
| 2014/0374093 A1* | 12/2014 | Nguyen | E21B 43/267 166/280.1 |
| 2015/0068747 A1* | 3/2015 | Hwang | C09K 8/80 166/280.2 |
| 2015/0083420 A1 | 3/2015 | Gupta et al. | |
| 2015/0101808 A1 | 4/2015 | Saini et al. | |
| 2015/0144339 A1* | 5/2015 | Vladimirovich | E21B 43/267 166/280.2 |
| 2015/0344772 A1* | 12/2015 | Droger | E21B 43/267 166/280.1 |
| 2016/0312595 A1* | 10/2016 | Surjaatmadja | E21B 43/267 |
| 2017/0167222 A1* | 6/2017 | Lee | C09K 8/62 |
| 2017/0218262 A1* | 8/2017 | Nguyen | E21B 43/166 |

OTHER PUBLICATIONS

Office Action dated Jun. 19, 2019 in by the Canadian Patent Office in Canadian Patent Application No. 3,015,995.

\* cited by examiner

FORMING PROPPANT-FREE CHANNELS IN A PROPPANT PACK

BACKGROUND

The embodiments herein relate generally to forming proppant-free channels in a proppant pack in subterranean formations.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any particular component thereof. By way of non-limiting example, a "treatment fluid" may be an acidizing fluid, a fracture-initiating fluid, a proppant-laden fluid, etc. As used herein, the term "fracture gradient" refers to a pressure necessary to create or enhance at least one fracture in a particular subterranean formation location, increasing pressure within a formation may be achieved by placing fluid therein at a high flow rate to increase the pressure on the formation. Placing a fluid at a rate or pressure that is below the threshold to create or enhance at least one fracture is known as placing the fluid into the formation at "matrix flow rate."

To achieve pressures above the fracture gradient, the treatment fluid is generally introduced at high pressures and/or high flow rates, which can cause turbulent flow of the treatment fluid. Such turbulent flow can result in friction pressure between the treatment fluid and subterranean formation equipment (e.g., wellbore piping, wellbore casing, and the like), as well as between the treatment fluid and the formation itself. Such friction pressure increases the energy necessary to pump the treatment fluid into the subterranean formation (e.g., the wellbore). Accordingly, friction reducing agents may be added to the treatment fluids to change the rheological properties of the treatment fluid to overcome or minimize the friction pressure.

Additionally, during stimulation operations, particulate solids are typically suspended in a portion of the treatment fluid and then deposited into the fractures, also increasing friction pressures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture."

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate generally to forming proppant-free channels in a proppant pack in subterranean formations and, more specifically, by using the miscibility and immiscibility of proppant-laden and proppant-free fluids.

As used herein, the term "proppant-laden" is used to describe fluids and clusters that comprise proppant. As used herein, the term "proppant-free" is used to describe fluids and channels that are substantially free of proppant (e.g., less than 1 wt % of the proppant that the corresponding proppant-laden fluid or cluster includes). For example, when proppant-laden fluid includes 10 wt % proppant, a proppant-free fluid may include less than 0.1 wt % proppant.

Figure 1:
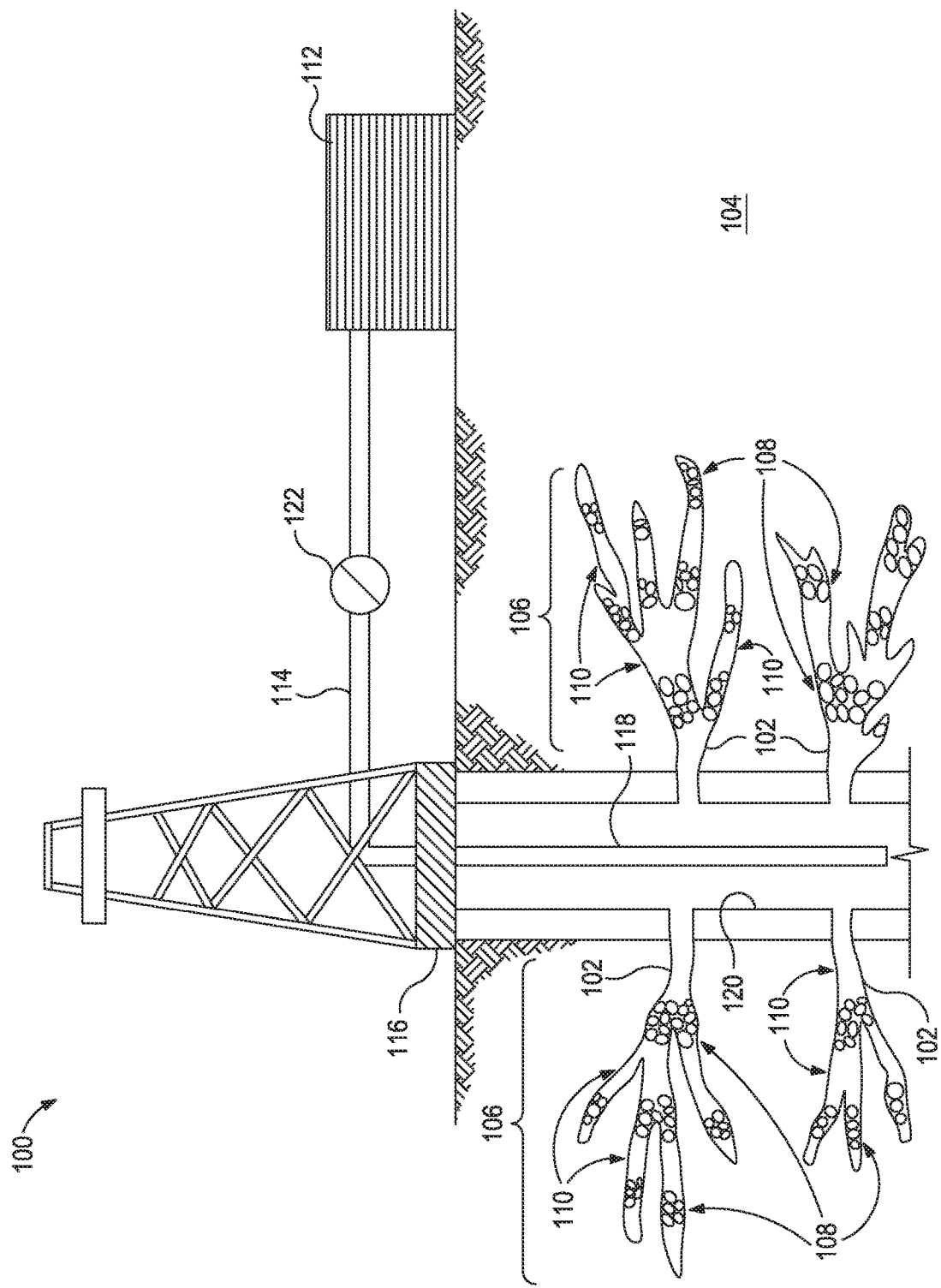
FIG. 1 shows an illustrative schematic of a system that can deliver proppant-laden fluids and proppant-free fluids to fractures in a subterranean formation, according to one or more embodiments, to form a proppant pack therein that includes proppant-laden clusters and proppant-free channels.

FIG. 1 shows an illustrative schematic of a system 100 that can deliver proppant-laden fluids and proppant-free fluids (described further below) to fractures 102 in a subterranean formation 104, according to one or more embodiments, to form a proppant pack 106 therein that includes proppant-laden clusters 108 and proppant-free channels 110.

The proppant-laden fluids described herein may comprise an oil-external emulsion and proppants. Oil-external emulsions (also referred to as "invert emulsions") may comprise a continuous oil phase, a discontinuous aqueous phase, and emulsifiers. Optionally, the proppant-laden fluids may further comprise at least one of: breakers, binding agents, degradable particles, friction reducing agents, and any combination thereof. Optionally, the discontinuous aqueous phase may optionally comprise a gelling agent and optionally further comprise a crosslinking agent.

The proppant-free fluids described herein may comprise an aqueous base fluid. Optionally, the proppant-free fluids may further comprise at least one of: gelling agents, crosslinking agents, friction reducing agents, binding agents, and any combination thereof.

To form the proppant pack 106, the proppant-laden fluids and the proppant-free fluids may be introduced into the fractures 102 in alternating order.

It should be noted that while FIG. 1 generally depicts a land-based system, it is to be recognized that like systems may be operated in subsea locations as well. As depicted in FIG. 1, system 100 may include one or more mixing tanks 112, in which the proppant-laden fluids and the proppant-free fluids may be formulated. In other embodiments, however, the proppant-laden fluids and the proppant-free fluids may be formulated offsite and transported to a worksite.

The proppant-laden fluids and the proppant-free fluids may be conveyed in alternating order via line 114 to wellhead 116 and enter a tubular 118 extending from wellhead 116 into subterranean formation 104. Upon being ejected from tubular 118, the alternating proppant-laden and proppant-free fluids may subsequently penetrate into fractures 102 in the subterranean formation 104 to form the proppant pack 106. In some instances, tubular 118 may have a plurality of orifices (not shown) through which the proppant-laden fluids and the proppant-free fluids may enter the wellbore 120 proximal to a portion of the subterranean formation 104 to be fractured/propped. In some instances, the wellbore 120 may further comprise equipment or tools (not shown) for zonal isolation of a portion of the subterranean formation 104 to be treated.

Pump 122 may be configured to raise the pressure of the proppant-laden fluids and the proppant-free fluids to a desired degree before introduction into tubular 118, whether the fluids are provided from the mixing tanks 112 or other vessel (e.g., a truck, a railcar, a barge, or the like). It is to be recognized that system 100 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. Further, FIG. 1 may be modified with suitable valves (before or after the pump 122) to appropriately alternate the fluid flow between the proppant-laden fluid and the proppant-free fluid.

The pump 122 may be a high pressure pump in some embodiments. As used herein, the term "high pressure pump" will refer to a pump that is capable of delivering a fluid downhole at a pressure of 1000 psi or greater. A high pressure pump may be used when it is desired to introduce the proppant-laden and proppant-free fluids to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump 122 may be a low pressure pump. As used herein, the term "low pressure pump" will refer to a pump that operates at a pressure of less than 1000 psi. In some embodiments, a low pressure pump may be fluidly coupled to a high pressure pump that is fluidly coupled to the tubular. That is, in such embodiments, the low pressure pump may be configured to convey the proppant-laden and proppant-free fluids to the high pressure pump. In such embodiments, the low pressure pump may "step up" the pressure of the proppant-laden and proppant-free fluids before it reaches the high pressure pump.

In some instances, one or both of the proppant-laden and proppant-free fluids may be introduced at or above a fracture gradient of the subterranean formation to create or extend at least one fracture in the subterranean formation. For example, a proppant-free fluid may be introduced above the fracture gradient, and, then, the fluid pressure may be dropped, which may still be at or above the fracture gradient or may be below the fracture gradient, when introducing the proppant-laden fluid and the proppant-free fluid in alternating order. In some instances, the proppant-free fluid used to fracture the formation may be different than the proppant-free fluid introducing in alternating order with the proppant-laden fluid.

To achieve proppant packs 106 of the present disclosure, fracturing operations may be performed with immiscible proppant-laden fluids and proppant-free fluids. In some instances, proppant-laden fluids may comprise an oil-external emulsion and proppants. In some instances, proppant-free fluids may comprise an aqueous base fluid.

Because the proppant-laden fluids and the proppant-free fluids are introduced in alternating order and are immiscible, the proppant pack 106 includes proppant-laden clusters 108 and proppant-free channels 110. Without being limited by theory, it is believed that the proppant-laden clusters 108 keeps the fractures 102 open while the proppant-free channels 110 enhance fluid flow through the proppant pack 106 and, consequently, increase hydrocarbon production from the formation 104.

Once the proppant pack is formed, the oil-external emulsion of the proppant-laden fluid may be broken (e.g., thermally and/or chemically), thereby forming a broken fluid that is miscible with the proppant-free fluid. Although not depicted in FIG. 1, the now miscible broken fluid and proppant-free fluid may, in some embodiments, flow back to wellhead 116 and exit subterranean formation 104.

In some instances, to mitigate migration of the proppant particulates in the proppant-laden clusters 108 into the proppant-free channels 110, a binding agent may be used to consolidate the proppant particulates in individual proppant-laden clusters 108. In some instances, when included in the proppant-laden fluid, the binding agent may be dissolved or otherwise suspended in the proppant-laden fluid (in either phase depending on the composition of the binding agent). In some instances, when included in the proppant-laden fluid, the binding agent may be a coating on at least a portion of the proppants.

In some instances, to increase the permeability of the proppant-laden clusters 108, the proppant-laden fluid may optionally further comprise degradable particles. When degradable particles are included, methods may further involve at least partially degrading the degradable particles before, after, or both relative to breaking the proppant-laden fluid.

It is also to be recognized that the disclosed proppant-laden and proppant-free fluids may also directly or indirectly affect the various downhole equipment and tools that may come into contact with the proppant-laden and proppant-free fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Exemplary oils that may be used as the continuous oil phase of the proppant-laden fluids may include, but are not limited to, kerosene, diesel oils, crude oils, gas oils, fuel oils, paraffin oils, mineral oils, low toxicity mineral oils, other petroleum distillates, polyolefins, polydiorganosiloxanes, siloxanes, organosiloxanes, and any combination thereof.

Exemplary aqueous fluids that may be used as the discontinuous aqueous phase in the proppant-laden fluids and/or the aqueous base fluid in the proppant-free fluids may include, but are not limited to, fresh water, sea water, naturally-occurring brine, produced water, chloride-based brines, bromide-based brines, formate-based brines, and the like, and any combination thereof. The aqueous fluids in each of the proppant-laden fluids and the proppant-free fluids may be the same or different.

The oil-to-water (OWR) ratio of the oil-external emulsions may range from about 30:70 to about 90:10, including subsets therebetween including about 50:50 to about 90:10, about 70:30 to about 90:10, or about 50:50 to about 70:30.

Exemplary emulsifiers may include, but are not limited to, polyaminated fatty acid, polyolefin amides and alkeneamides, and the like, and any combination thereof.

Proppants for use in the proppant-laden fluids may comprise a plurality of proppant particulates. Particulates suitable for use in the embodiments of the present invention may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh (1 cm) to about 400 mesh (0.04 mm) or less on the U.S. Sieve Series; however, in certain circumstances, other sizes or mixtures of sizes may be desired and will be entirely suitable for practice of the embodiments described herein. In particular embodiments, preferred mean particulates size distribution ranges are one or more of 6/12 mesh (3.4 mm/1.7 mm), 8/16 mesh (2.4 mm/1.2 mm), 12/20 mesh (1.7 mm/0.84 mm), 16/30 mesh (1.2 mm/0.56 mm), 20/40 mesh (0.84 mm/0.4 mm), 30/50 mesh (0.60 mm/0.30 mm), 40/60 mesh (0.4 mm/0.25 mm), 40/70 mesh (0.40 mm/0.21 mm), or 50/70 mesh (0.30 mm/0.21 mm). It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may optionally be included in the proppant-laden fluid. In some embodiments, proppants (e.g., one or more types of proppant particulates) may be present in a proppant-laden fluid in an amount in the range of from about 0.01 pounds per gallon ("ppg") to about 30 ppg by volume of the proppant-laden fluid, including subsets therebetween (e.g., about 0.01 ppg to about 0.1 ppg, about 0.01 ppg to about 0.5 ppg, about 0.01 ppg to about 1 ppg, about 0.1 to about 1 ppg, about 1 ppg to about 10 ppg, about 1 ppg to about 30 ppg, about 5 ppg to about 20 ppg, or about 10 ppg to about 30 ppg).

Breakers may be used to break the oil-external emulsion. Exemplary breakers may include, but are not limited to, alkali metal carbonates, alkali metal bicarbonates, alkali metal acetates, alkaline earth metal oxides (e.g., magnesium oxide), alkali metal hydroxides, amines, weak acids, and the like, and any combination thereof. In some instances, breakers may be encapsulated to delay breaking of the oil-external emulsion. Exemplary encapsulated breakers may utilize one of the following as an encapsulant: gelatin, starch, shellac, poly(methyl methacrylate), polyvinylidene chloride, titanium dioxide, polysaccharides (such as dextran or cellulose), chitins, chitosans, proteins, aliphatic polyesters, polylactic acids, poly(glycolides), poly(s-caprolactones), poly(hydroxy ester ethers), poly(hydroxybutyrates), poly(anhydrides), aliphatic polycarbonates, orthoester, poly(orthoesters), poly(amino acids), poly(ethylene oxides), poly(phosphazenes), polyetheresters, polyester amides, polyamides, an arginine methyl ester, an alkanolamine, an alkylenediamide, an alkyl ester sulfonate, an alkyl ether sulfonate, an alkyl ether sulfate, an alkali metal alkyl sulfate, an alkyl or an alkylaryl sulfonate, a sulfosuccinate, an alkyl or alkylaryl disulfonate, an alkyl disulfate, an alcohol polypropoxylated and/or polyethoxylated sulfate, a taurate, an amine oxide, an ethoxylated amide, an alkoxylated fatty acid, an alkoxylated alcohol, an ethoxylated fatty amine, an ethoxylated alkyl amine, a betaine, a modified betaine, an alkylamidobetaine, a quaternary ammonium compound, and the like, and any combination thereof, where "alkyl" in the foregoing compositions may be a $C_3$-$C_{24}$ hydrocarbon chain that may be branched or linear and optionally include cyclic and/or aromatic rings. When included in a proppant-laden fluid, the breakers may be present in an amount ranging from about 0.01% to about 20% by weight of the oil-external emulsion, including subsets therebetween (e.g., about 1% to about 10%, about 0.1% to about 5%, about 1% to about 20%, or about 5% to about 20%).

Binding agents may be used to consolidate proppant particulates in individual proppant-laden clusters and mitigate migration of proppant particulates into the proppant-free channels. Exemplary binding agents may include, but are not limited to, non-aqueous tackifying agents, aqueous tackifying agents, silyl-modified polyamides, hardenable resins, cements, and the like, and any combination thereof. As used herein, "tackifying agents" refer to polymers and resins that are non-hardening (i.e., tacky) at downhole temperatures and pressures. As used herein, "hardenable resins" refer to polymers and resins that harden (i.e., are not tacky) at downhole temperatures and pressures. In some instances, hardenable resins may be tacky when introduced into the wellbore and then harden at downhole temperatures and pressures. When included in a proppant-laden fluid or a proppant-free fluid, the binding agents may be present in an amount ranging from about 0.01% to about 20% by weight of the oil-external emulsion, including subsets therebetween (e.g., about 1% to about 10%, about 0.1% to about 5%, about 1% to about 20%, or about 5% to about 20%).

Degradable particles may be used to create voids in proppant-laden clusters. For example, some embodiments may involve degrading (e.g., chemically, biologically, thermally, or a combination thereof) degradable particles in a proppant-laden cluster, thereby leaving voids in the proppant-laden cluster. Degradable particles may comprise degradable polymers. A polymer is considered to be "degradable" herein if the degradation is due to, in situ, a chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades (e.g., initiated and/or accelerated by temperature, presence of moisture, oxygen, microorganisms, enzymes, pH, and the like). Suitable examples of degradable polymers for use in degradable particles may include, but are not limited to, polysaccharides such as dextran or cellulose, chitins, chitosans, proteins, aliphatic polyesters, poly(lactides), poly(glycolides), poly(s-caprolactones), poly(hydroxybutyrates), poly(anhydrides), aliphatic or aromatic polycarbonates, poly (orthoesters), poly(amino acids), poly(ethylene oxides), polyphosphazenes, and the like, and any combination thereof. When included in a proppant-laden fluid, the binding agents may be present in an amount ranging from about 10% to about 90% by weight of the proppant, including subsets therebetween (e.g., about 10% to about 50%, about 20% to about 70%, or about 25% to about 50%). Degradable particulates may have a mean particulate size generally ranging from about 2 mesh (1 cm) to about 400 mesh (0.04 mm) or less on the U.S. Sieve Series (including subsets thereof described relative to proppants).

Gelling agents may be included in the aqueous phase of the oil-external emulsion or the aqueous base fluid of the proppant-free fluid to increase the viscosity thereof. Exemplary gelling agents may include, but are not limited to, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and combinations thereof. Exemplary synthetic polymer gelling agents may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and combinations thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer. When included, the gelling agents may be present in an amount ranging from about 0.1% to about 10% by weight of the aqueous phase of the oil-external emulsion or the aqueous base fluid of the proppant-free fluid, including subsets therebetween (e.g., about 1% to about 10%, about 0.1% to about 5%, or about 5% to about 10%).

In some embodiments when it is desirable to crosslink the gelling agent to further increase the viscosity of the aqueous phase of the oil-external emulsion or the aqueous base fluid of the proppant-free fluid, the fluid may comprise one or more crosslinking agents. The crosslinking agents may comprise a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions. Examples of such compounds include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. When included, the crosslinking agents may be present in an amount ranging from about 0.005% to about 1% by weight of the aqueous phase of the oil-external emulsion or the aqueous base fluid of the proppant-free fluid, including subsets therebetween (e.g., about 0.01% to about 1%, about 0.005% to about 0.1%, or about 0.1% to about 1%).

Friction reducing agents may among other things, reduce energy losses due to friction in the proppant-laden fluid and proppant-free fluid described herein. Exemplary friction reducing agents may include, but are not limited to, a quaternized aminoalkyl acrylate (e.g., a copolymer of acrylamide and dimethylaminoethyl acrylate quaternized with benzyl chloride), acrylamide, and any combination thereof. Additional exemplary friction reducing agents may include, but are not limited to, copolymers of acrylamide with one or more of the following monomers: acrylic acid, 2-acrylamido-2-methylpropanesulfonic acid, N,N-dimethyl acrylamide, vinylsulfonic acid, N-vinyl acetamide, N-vinyl formamide, and the like. When included, the friction reducing agents may be present in an amount ranging from about 0.01% to about 0.5% by weight of the aqueous phase of the oil-external emulsion or the aqueous base fluid of the proppant-free fluid, including subsets therebetween (e.g., about 0.05% to about 0.5%, about 0.01% to about 0.1%, or about 0.1% to about 0.5%).

Embodiments of the present disclosure include, but are not limited to, Embodiment A, Embodiment B, and Embodiment C.

Embodiment A is a method that comprises: introducing, in alternating order, a proppant-laden fluid and a proppant-free fluid into a wellbore penetrating a subterranean formation, wherein the proppant-laden fluid comprises an oil-external emulsion and a proppant, and wherein the proppant-free fluid is immiscible with the proppant-laden fluid; and forming a proppant pack in a fracture in the subterranean formation, wherein the proppant pack comprises proppant-laden clusters and proppant-free channels. Embodiment A may optionally include one or more of the following elements: Element 1: the method further comprising after forming the proppant pack, breaking the oil-external emulsion to form a broken fluid that is miscible with the proppant-free fluid; Element 2: the method further comprising after forming the proppant pack, breaking the oil-external emulsion to form a broken fluid that is miscible with the proppant-free fluid, wherein the proppant-laden fluid further comprises an internal breaker; Element 3: the method further comprising after forming the proppant pack, breaking the oil-external emulsion to form a broken fluid that is miscible with the proppant-free fluid, wherein the proppant-laden fluid further comprises an encapsulated breaker; Element 4: wherein the proppant-laden fluid further comprises a binding agent; Element 5: wherein the proppant-laden fluid further comprises a binding agent, and wherein the binding agent comprises one selected from the group consisting of: a non-aqueous tackifying agent, an aqueous tackifying agent, a silyl-modified polyamide, a hardenable resin, a cement, and any combination thereof; Element 6: wherein the proppant-laden fluid further comprises a binding agent, and wherein the binding agent is a coating on the proppant; Element 7: wherein the proppant-laden fluid further comprises a degradable particle; Element 8: wherein the proppant-laden fluid further comprises a degradable particle, and where the method further comprises at least partially degrading the degradable particle to form voids in the proppant-laden clusters; Element 9: wherein the proppant-free fluid comprises an aqueous fluid and a gelling agent; and Element 10: wherein the proppant-free fluid comprises an aqueous fluid and a gelling agent, and wherein the gelling agent is a crosslinked polymer. Exemplary combinations of elements may include, but are not limited to, Elements 2 and 3 in combination; Elements 5 and 6 in combination; one or more of Elements 1-3 in combination with one or more of Elements 4-6; one or more of Elements 1-3 in combination with one or more of Elements 7-8; one or more of Elements 1-3 in combination with one or more of Elements 9-10; one or more of Elements 4-6 in combination with one or more of Elements 7-8; one or more of Elements 4-6 in combination with one or more of Elements 9-10; one or more of Elements 7-8 in combination with one or more of Elements 9-10; and any combination thereof.

Embodiment B is a method that comprises: introducing a proppant-free fluid into a wellbore penetrating a subterranean formation at or above a fracture gradient of the subterranean formation to create or extend at least one fracture in the subterranean formation; then, introducing, in alternating order, a proppant-laden fluid and the proppant-free fluid into the wellbore at or above the fracture gradient, wherein the proppant-laden fluid comprises an oil-external emulsion, a proppant, and a binding agent, and wherein the proppant-free fluid is immiscible with the proppant-laden fluid; forming a proppant pack in the at least one fracture, wherein the proppant pack comprises proppant-laden clusters and proppant-free channels; hardening the binding agent downhole to form proppant aggregates; reducing a wellbore pressure to below the fracture gradient; and after forming the proppant aggregates, breaking the oil-external emulsion to form a broken fluid that is miscible with the proppant-free fluid. Embodiment B may optionally include one or more of the following elements: Element 7; Element 8; Element 9; Element 10; Element 11: wherein the breaker comprises an internal breaker; Element 12: wherein the breaker comprises an encapsulated breaker; Element 13: wherein the binding agent comprises one selected from the group consisting of: a non-aqueous tackifying agent, an aqueous tackifying agent, a silyl-modified polyamide, a hardenable resin, a cement, and any combination thereof; and Element 14: wherein the binding agent is a coating on the proppant. Exemplary combinations of elements may include, but are not limited to, Elements 11 and 12 in combination; Elements 13 and 14 in combination; one or more of Elements 11-12 in combination with one or more of Elements 13-14; one or more of Elements 11-12 in combination with one or more of Elements 7-8; one or more of Elements 11-12 in combination with one or more of Elements 9-10; one or more of Elements 13-14 in combination with one or more of Elements 7-8; one or more of Elements 13-14 in combination with one or more of Elements 9-10; one or more of Elements 7-8 in combination with one or more of Elements 9-10; and any combination thereof.

Embodiment C is a system for performing the method of Embodiments A or B (including any optional Elements and combinations of Elements associated therewith) comprising: a pump fluidly connected to a wellbore penetrating a subterranean formation that alternately introduces the proppant-free fluid and the proppant-laden fluid into the wellbore.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 5," the range of 4.75 to 5.25 is encompassed. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Figure 2:
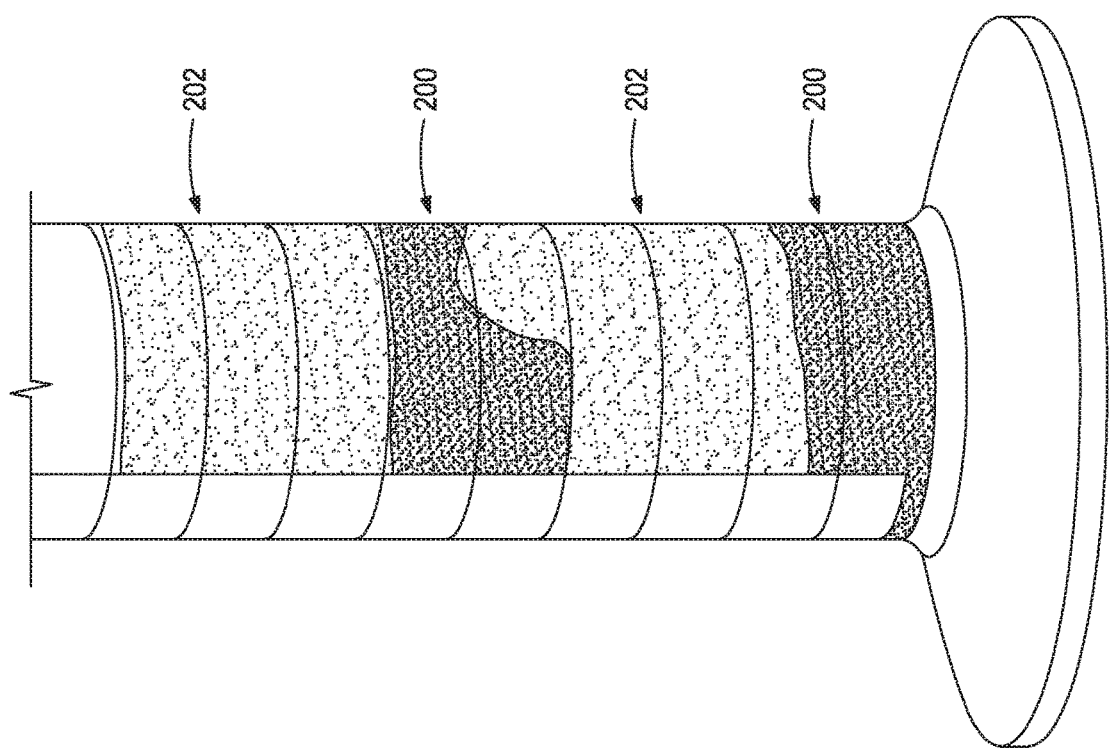
FIG. 2 illustrates the immiscibility of proppant-laden fluids and proppant-free fluids in a graduated cylinder.

FIG. 2 illustrates the immiscibility of a prepared proppant-laden fluid 200 and proppant-free fluid 202. The proppant-laden fluid 200 was a 6 lb/gal of 20/40-mesh UNIFRAC® sand (available from Unimin Energy Solutions) in an oil-external emulsion. The oil-external emulsion was prepared with a LCA-1™ oil (paraffinic solvent, available from Halliburton Energy Services, Inc.), tap water, EZMUL™ emulsifier (invert emulsifier, available from Halliburton Energy Services, Inc.), and SANDWEDGE® (tackifying agent, available from Halliburton Energy Services, Inc.). The proppant-free fluid 202 was prepared by including 25 lb/Mgal WG-36 (polysaccharide gelling agent, available from Halliburton Energy Services, Inc.) cross-linked with CL-31 (borate crosslinking agent, available from Halliburton Energy Services, Inc.) in tap water. The proppant-laden fluid 200 and proppant-free fluid 202 were added to a graduated cylinder in alternating order. FIG. 2 shows that the proppant-laden fluid 200 and proppant-free fluid 202 are immiscible.

Figure 3:
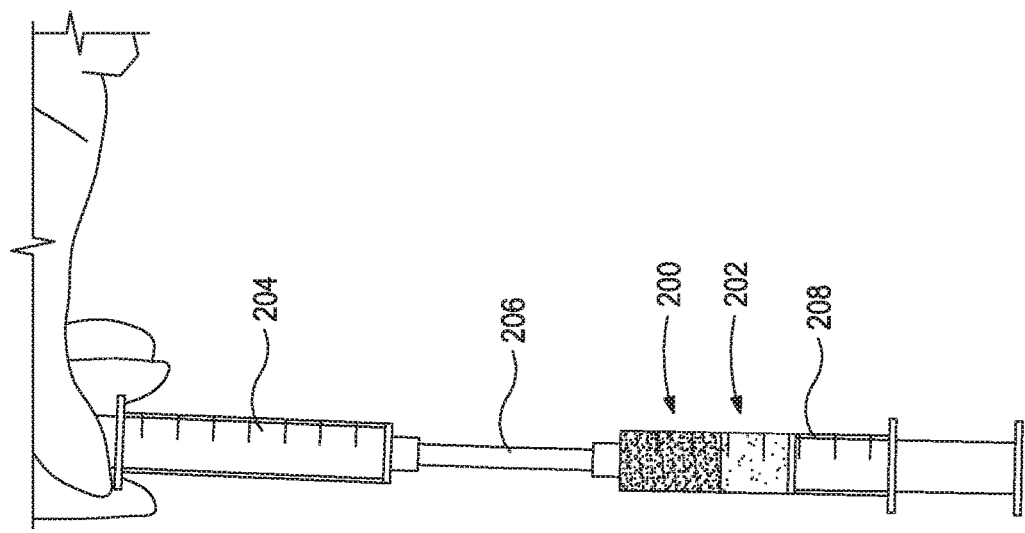
FIG. 3 illustrates the immiscibility of proppant-laden fluids and proppant-free fluids are maintained when flowed between two syringes.

To test the ability of the two fluids to maintain immiscibility under flow, the proppant-laden fluid 200 and proppant-free fluid 202 were added to a first syringe 204 that was connected via a tube 206 to a second syringe 208. The proppant-laden fluid 200 and proppant-free fluid 202 were transferred between the syringes 204,208 several times and maintained two distinct immiscible fluids as shown in FIG. 3. These examples illustrate that the methods described herein with immiscible proppant-laden fluids and proppant-free fluids remain immiscible under flow and may be useful in forming proppant packs described herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   preparing an oil-external emulsion comprising an emulsifier;
   introducing, in alternating order, a proppant-laden fluid and a proppant-free fluid into a wellbore penetrating a subterranean formation, wherein the proppant-laden fluid comprises the oil-external emulsion and a proppant, wherein the proppant-free fluid comprises an aqueous fluid, and wherein the proppant-free fluid is immiscible with the proppant-laden fluid, wherein the proppant-laden fluid further comprises a binding agent comprising a hardenable resin;
   wherein the emulsifier is selected from the group consisting of polyaminated fatty acid, polyolefin amides, alkeneamides, and any combinations thereof;
   forming a proppant pack in a fracture in the subterranean formation with the proppant-laden fluid and the proppant-free fluid, wherein the proppant pack comprises proppant-laden clusters and proppant-free channels; and
   after forming the proppant pack, breaking the oil-external emulsion to form a broken fluid that is miscible with the proppant-free fluid.

2. The method of claim 1, wherein the proppant-laden fluid further comprises an internal breaker.

3. The method of claim 1, wherein the proppant-laden fluid further comprises an encapsulated breaker.

4. The method of claim 1, wherein the binding agent further comprises one selected from the group consisting of: a non-aqueous tackifying agent, an aqueous tackifying agent, a silyl-modified polyamide, a cement, and any combination thereof.

5. The method of claim 1, wherein the binding agent is a coating on the proppant.

6. The method of claim 1, wherein the proppant-laden fluid further comprises a degradable particle.

7. The method of claim 6 further comprising: at least partially degrading the degradable particle to form voids in the proppant-laden clusters.

8. The method of claim 1, wherein the proppant-free fluid further comprises a gelling agent.

9. The method of claim 8, wherein the gelling agent is a crosslinked polymer.

10. A system for performing the method of claim 1 comprising:
    a pump fluidly connected to a wellbore penetrating the subterranean formation, wherein the pump alternately introduces the proppant-free fluid and the proppant-laden fluid into the wellbore.

11. A method comprising:
    preparing an oil-external emulsion comprising an emulsifier;

introducing a proppant-free fluid into a wellbore penetrating a subterranean formation at or above a fracture gradient of the subterranean formation to create or extend at least one fracture in the subterranean formation, wherein the proppant-free fluid comprises an aqueous fluid;

then, introducing, in alternating order, a proppant-laden fluid and the proppant-free fluid into the wellbore at or above the fracture gradient, wherein the proppant-laden fluid comprises the oil-external emulsion, a proppant, and a binding agent comprising a hardenable resin, and wherein the proppant-free fluid is immiscible with the proppant-laden fluid;

wherein the emulsifier is selected from the group consisting of polyaminated fatty acid, polyolefin amides, alkeneamides, and any combinations thereof;

forming a proppant pack in the at least one fracture with the proppant-laden fluid and the proppant-free fluid, wherein the proppant pack comprises proppant-laden clusters and proppant-free channels;

hardening the binding agent downhole to form proppant aggregates;

reducing a wellbore pressure to below the fracture gradient; and after forming the proppant aggregates, breaking the oil-external emulsion to form a broken fluid that is miscible with the proppant-free fluid.

12. The method of claim 11, wherein the proppant-laden fluid further comprises a degradable particle.

13. The method of claim 12 further comprising: at least partially degrading the degradable particle to form voids in the proppant-laden clusters.

14. The method of claim 11, wherein the binding agent is a coating on the proppant.

15. The method of claim 11, wherein the proppant-free fluid further comprises a gelling agent.

16. A system for performing the method of claim 11 comprising:

a pump fluidly connected to a wellbore penetrating the subterranean formation, wherein the pump alternately introduces the proppant-free fluid and the proppant-laden fluid into the wellbore.

* * * * *